United States Patent [19]

Ichikawa et al.

[11] 4,058,787
[45] Nov. 15, 1977

[54] TEMPERATURE SENSOR

[75] Inventors: Norio Ichikawa, Mito; Sadayasu Ueno, Katsuta, both of Japan

[73] Assignee: Hitachi, Ltd., Japan

[21] Appl. No.: 669,702

[22] Filed: Mar. 23, 1976

[30] Foreign Application Priority Data

Apr. 4, 1975    Japan .................................. 50-40290

[51] Int. Cl.² .............................................. H01C 7/04
[52] U.S. Cl. ..................................... 338/22 R; 338/28; 338/30; 338/229; 338/271; 338/328; 338/329
[58] Field of Search ........................ 338/22, 28, 30, 34, 338/229, 271, 329, 328; 73/27, 359 R, 398 AR, 362 AR

[56] References Cited

U.S. PATENT DOCUMENTS

| 3,832,668 | 8/1974 | Berman | 338/22 SD |
| 3,919,680 | 11/1975 | Ueno et al. | 338/28 |
| 3,928,837 | 12/1975 | Esper et al. | 338/22 R |

*Primary Examiner*—C. L. Albritton
*Attorney, Agent, or Firm*—Craig & Antonelli

[57] ABSTRACT

A drawer type electrode of a thermistor for sensing high temperatures, wherein a shaft and a sheath are connected to a thermistor, is constructed such that the shaft and the sheath are brought into contact with the positive and negative electrode surfaces of the thermistor through precious metal chips so that electrical connection between the precious metals, the shaft and the sheath will not be impaired in any way even if oxidation penetrates into the interior from the shaft and the sheath surface due to high temperature.

6 Claims, 3 Drawing Figures

TEMPERATURE SENSOR

BACKGROUND OF THE INVENTION

This invention relates to a temperature sensor using a thermistor, and more particularly to a temperature sensor suitable for measuring high temperature such as the temperature of exhaust gases of an automotive engine.

Heretofore, a high temperature sensor has been known which carries out temperature measurements by taking out the variance in resistance value of the thermistor through respectively bringing the drawer type electrode into contact with the positive electrode surface and the negative electrode surface of the thermistor.

In the high temperature sensor of the type described, there has been a problem of increase in contact resistance between the thermistor and the drawer type electrode in the use for a long period of time. As a measure for solving this problem, a method is adoptable wherein platinum which is highly heat resistant and acid proof is coated in a state of paste and backed on the surfaces of the thermistor and of the draw type electrode thereof, for example. Such a method brings about a good effect to the thermistor. In other words, a high retention is obtained after the baking of the platinum paste. However, in the case of the shaft and the sheath that are acting as the drawer type electrode, the baking is made at the metallic surfaces, thus raising a problem in durability.

For example, a temperature sensor of a converter for exhaust gas treatment in an automobile is required to withstand a very high temperature such as 1,100° C. Although the shaft and the sheath are made of materials highly heat resistant and acid proof such as a stainless steel or a nickel-chrome alloy "the commercial name-Inconel (phonetic)", oxidation still penetrates into the interior from the surface. According to results of experiments, the depth of penetration of said oxidation reaches 0.05 mm and sometimes 0.2 mm. Accordingly, it is necessary to fully withstand such a penetration of oxidation. It is conceivable to plate the shaft and the sheath with a precious metal for preventing oxidation, but this method is not satisfactory because problems such as pin-holes arise.

Further, in measuring the exhaust temperature of an automobile, it is necessary to fully withstand the vibrations imparted from the engine to the temperature sensor. Consequently, a mechanical strength as high as approx. 20 G is required.

SUMMARY OF THE INVENTION

One object of this invention is to provide a high temperature sensor which has a high durability and mechanical strength.

The feature of this invention is that a shaft and a sheath constituting a drawer type electrode of a thermister are arranged to be brought into contact with said thermistor through precious metal chips so that electrical connection between the precious metals, the shaft and the sheath will not be impaired in any way even if oxidation penetrates into the interior from the shaft and the sheath surface due to a high temperature.

DETAILED DESCRIPTION OF THE PREFERRED EMBODIMENT

Figure 1:
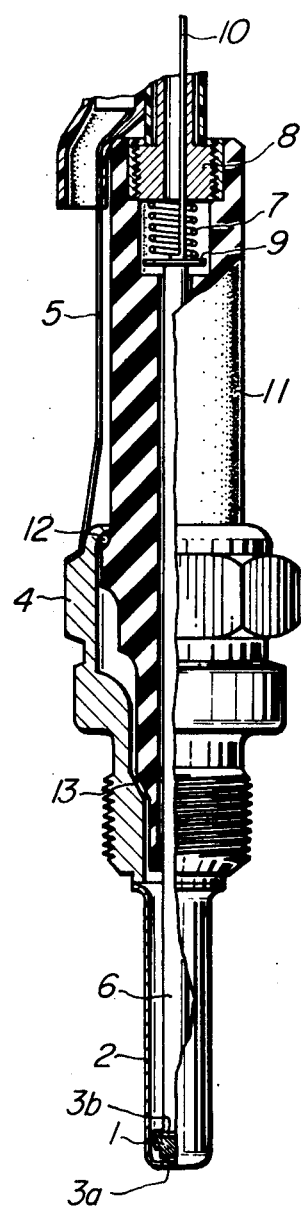
FIG. 1 is a view explaining the construction of the high temperature sensor.

The temperature sensor shown in FIG. 1 is, for example, used for giving an alarm in case the temperature within a catalytic converter for use in an automobile exceeds the preset value for the protection of the converter.

The negative electrode surface 1a of a thermistor 1 is brought into contact with a precious metal such as a platinum chip 3a which is welded to the interior of a cylindrical sheath 2 made of an electrically conductive and heat resistant metal. Further, the sheath 2 is solidly secured to an electrically conductive plug body 4. A grounding conductor 5 is a belt like thin metallic plate which is highly heat resistant and is secured to the plug body 4 by spot welding.

The positive electrode surface 1b of the thermistor 1 is brought into contact with an end face of a shaft 6 made of a heat resistant metal through a precious metal chip 3b through the agency of the pressure of a spring 7. The precious metal chip 3b is welded to the end face of the shaft 6.

Welded to a flange portion 9 of the shaft 6 is an outgoing line 10 which is bundled with the grounding conductor 5 through an insulating tube and connected to a connector (not shown). An insulator 11 is caulked to the plug body 4 through a ring 12 and a packing 13.

Threadably coupled to the head portion of the insulator is a shaft head 8. Further, intervenedly mounted between said shaft head and the flange portion 9 is a spring 7. Contact pressure between the shaft 6, the thermistor 1 and the sheath 2 is obtained by the spring 7.

Figure 2:
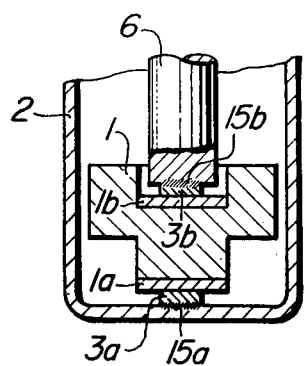
FIG. 2 is an enlarged view showing the thermistor portion of FIG. 1.

FIG. 2 is an enlarged cross-sectional view showing the contact portion between the thermistor 1, the shaft 6 and the sheath. The shaft 6 is electrically connected to the precious metal cip 3b through an alloy portion 15b formed by welding. Since the shaft 6 is urged by the spring, the precious metal chip 3b is pressed against the positive electrode surface 1b of the thermistor 1. Further, the precious metal chip 3a is electrically connected to the inner surface of the lower portion of the sheath 2 through an alloy portion 15a formed by welding. The thermistor 1 is also urged by the force of the spring with the negative electrode surface thereof being in pressed contact with the precious metal chip 3.

The precious metal chips 3a and 3b are required to be made of highly acid proof metal at high temperatures, such as platinum, rhodium, palladium or alloys between those metals. Being highly extensible, those metals and alloys are very easily worked.

The precious metals 3a and 3b, the sheath and the shaft are highly acid proof because they are solidly secured to one another by welding. The reason will be described with reference to FIG. 3. The precious metal chip 3b is mounted on the end face of the shaft 6, and a high current flows between the precious metal chip 3b and the end face of the shaft 6 by means of a welding electrode 17. As a result, the contact portion between the precious metal chip 3b and the end face of the shaft is melted by heat, thus forming the alloy portion 15b.

Figure 3:
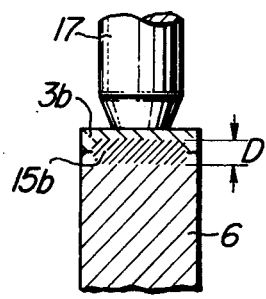
FIG. 3 is a cross-sectional view showing the state of welding made between the shaft 6 an a precious metal 3'.

The temperature of the shaft is sometimes raised to as high as 1,100° C during the measurement of exhaust gas temperature. The temperature is elevated to 700° to 800° C even in normal conditions. Therefore, oxidation gradually penetrates deep into the interior from the surface. Oxidation may sometimes reach as deep as 0.2 mm in the use for a prolonged period of time. The service life of a temperature sensor for use in an automobile is required to be considerably long. Further, water may splash on a temperature sensor unlike other ordinary sensors, thus allowing moisture to enter the interior of the sensor. When the precious metal is secured to the shaft or the sheath by welding, the thickness D of the alloy portion 15b shown in FIG. 3 is so enlarged that the depth of the alloy layer to the shaft 6 becomes more than 0.2 mm. Accordingly, increased electric resistance due to oxidation will not prevent the measurement of temperature even in use for a prolonged period of time.

FIG. 3 is a view in explanation of the shaft 6 and the precious metal. The same reason and effect as above is quite true with the welding made between the sheath 2 and the precious metal chip 3a.

The work becomes very easy if wire-like or thin belt-like precious metal chips 3a and 3b are used. Automating of the work becomes also easier if the precious metals are cut off after the precious metals are welded to the shaft or the sheath. If the precious metal chips are formed into spherical shapes, automatic mounting of those chips on to the end face of the shaft or the sheath surface becomes easier. Further, condenser welding is preferable, in which electric energy is accumulated in a condenser and then high current flows between the precious metal and the shaft or the sheath. For example, as shown in FIG. 3, if one of the welding electrodes is applied to the precious metal chip 3b, the other welding electrode is mounted on the shaft 6, the electric energy accumulated first in the condenser is sent through the precious metal chip 3b and the shaft 6 for a short period of time, then the contact surface between the precious metal chip 3b and the shaft 6 is melted, while no other portions are adversely affected. The surfaces of the precious metals are not damaged either. Because the necessary electric energy is previously accumulated first and then applied to the welding portion, a suitable currentflow can be supplied, thereby preventing an excess or shortage in current-flow.

What is claimed is:

1. A temperature sensor wherein said senser comprises:
   an electrically conductive cylindrical sheath closed at one end;
   an electrically conductive support member having a hollow portion and solidly secured to the open end of the sheath at one end thereof;
   an insulating body having a hollow portion and supported within the support member;
   a thermistor disposed inside of the closed end face of said sheath and one of which electrode surfaces is electrically connected to said sheath;
   a shaft made of an electrically conductive material whose one end is brought into contact with the other of the electrode surfaces of said thermistor and extending through the hollow portions of the sheath and the insulating body; and
   means for providing the contact pressure between the shaft, the thermistor and the sheath;
   whereby the variance in resistance value of the thermistor is taken out between the support member and the shaft to carry out temperature sensing; characterized in that:
   a precious metal chip is welded and secured to the end face of the shaft on the side of thermistor.

2. A temperature sensor as set forth in claim 1, characterized in that:
   a precious metal chip is welded and secured to the sheath surface opposite to the thermistor.

3. A temperature sensor as set forth in claim 1, characterized in that:
   the depth of an alloy layer formed by chip welding is made to be more than 0.2 mm.

4. In a temperature sensor including:
   an electrically conductive cylindrical sheath closed at one end thereof and open at the opposite end thereof;
   an electrically conductive sypport member having a hollow portion, one end of which is solidly secured to the open end of said sheath;
   an insulating body having a hollow portion and supported within said support member;
   a thermistor disposed within the closed end of said sheath and having a first electrode surface on the side thereof facing said closed end electrically connected to said sheath and having a second electrode surface on the opposite side thereof;
   an electrically conductive shaft one end of which is electrically connected to said second electrode surface of said thermistor, said shaft extending through the hollow portions of said sheath and said insulating body; and
   means for forcing said shaft, thermistor and sheath into contact pressure with each other;
   whereby a variation in resistance value of said thermistor due to temperature is derived between said support member and said shaft;
   the improvement comprising
   means for effecting an oxidation resistant electrical connection between said one end of said shaft and said second electrode surface of said thermistor comprising a precious metal chip melted and secured to said one end of said shaft, so that said shaft is forced into physical and electrical contact with said second electrode surface of said thermistor through the precious metal chip therebetween.

5. The improvement according to claim 4, further comprising means for effecting an oxidation resistant electrical connection between the closed end of said sheath and said first electrode surface of said thermistor comprising a precious metal chip melted and secured to said closed end of said sheath, so that said closed end of said sheath is forced into physical and electrical contact with said first electrode surface of said thermistor through the precious metal chip therebetween.

6. The improvement according to claim 5, wherein each of said chips is welded to its respective sheath and shaft, and an alloy layer is formed between the shaft and the chip welded thereto to a depth of at least 0.2 mm.

* * * * *